Patented May 12, 1931

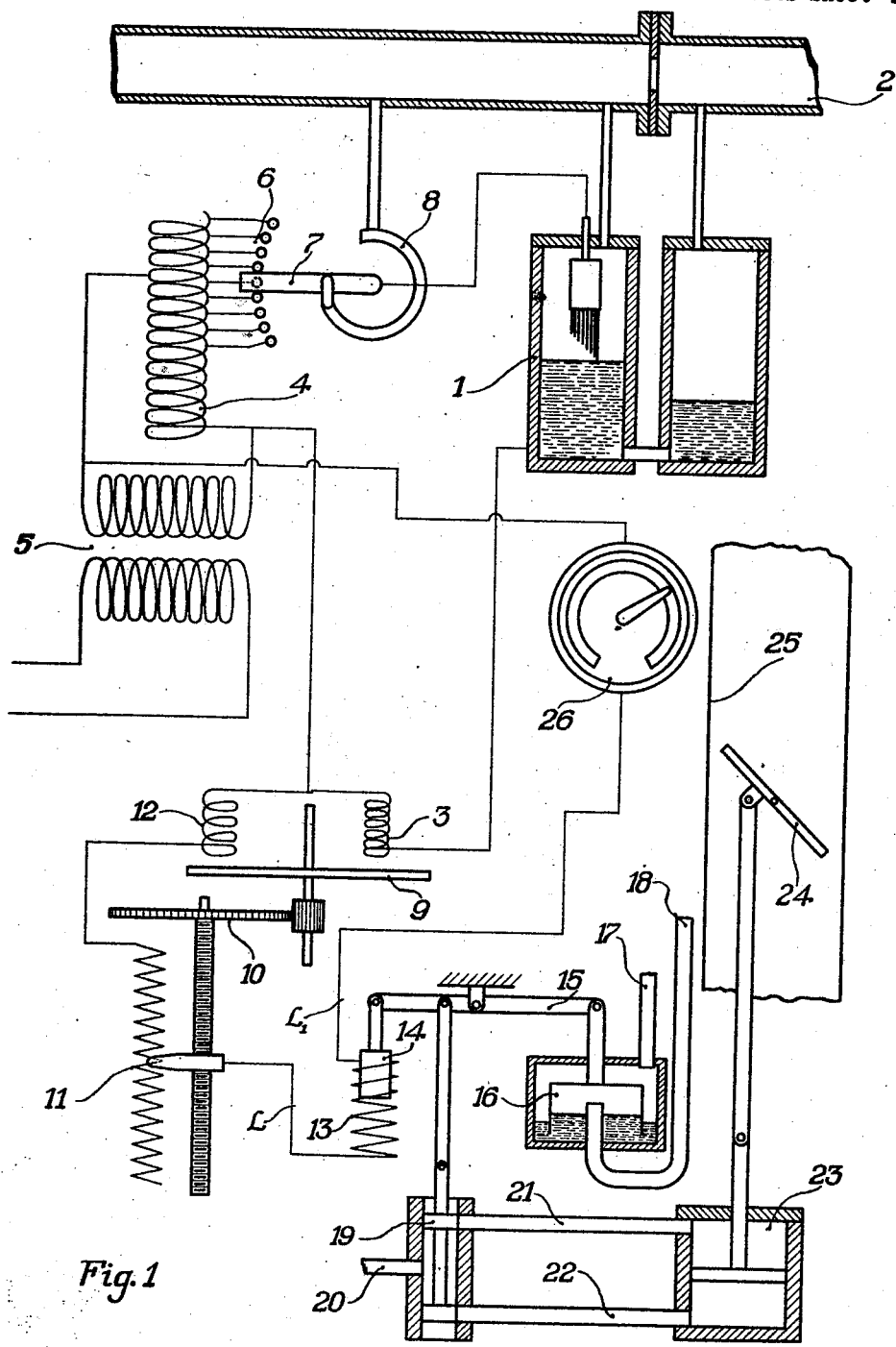

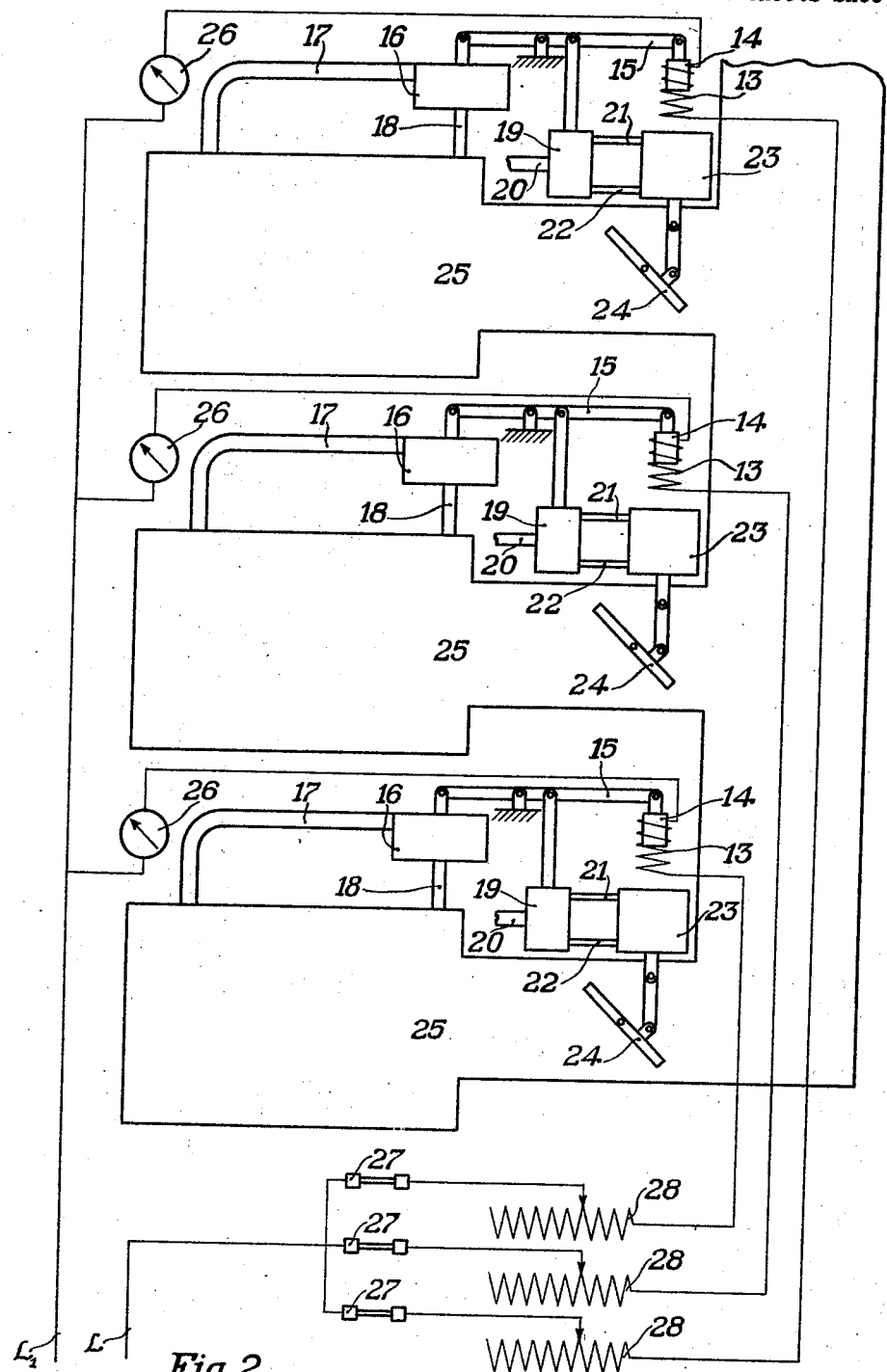

1,805,012

UNITED STATES PATENT OFFICE

ALEXANDER G. S. SANDISON, OF KELDA, BALTASOUND, SHETLAND ISLANDS

MEANS FOR REGULATING COMBUSTION IN BOILER FURNACES

Application filed October 5, 1928, Serial No. 310,488, and in Great Britain November 4, 1927.

This invention relates to the automatic regulation of the combustion in boiler furnaces, and has for its object to provide means whereby the dampers or other air regulating means of one or more boilers may be so controlled as to maintain automatically combustion conditions of maximum efficiency on varying loads, and prevent any appreciable departure from the correct steam pressure. The invention has further for its object to provide means whereby the total load on the boiler plant may be distributed uniformly, or in the desired proportion, among the boilers which may be in operation at the particular time.

It is well known that, to obtain maximum boiler efficiency, it is necessary to supply air for combustion in a definite but comparatively small excess of that theoretically required for complete combustion of the fuel, such excess generally ranging from 20% to 70% depending on the class of fuel used. Further, it is well known that a good approximation to such correct air supply can be obtained by so regulating the boiler controls as to maintain proportionality between the steam flow, the flow of flue gas, and the rate of feed of fuel to the furnace. As the correct proportionality depends on the class of fuel and other factors which may vary from time to time, it is necessary to provide suitable adjusting means to effect changes in this proportionality if the maximum efficiency is to be obtained. The pressure drop across one or more passes of the boiler, or across a suitable obstruction in the path of the air supply to the furnace, or in the path of the flue gas, gives a measure of the flow of flue gas.

According to the present invention an electrical control current, varying upon variations of the steam flow and/or pressure, produces forces on an electro-magnetic device normally balanced by forces depending on the difference in pressure at two points in the path of the air supply to the furnace or in the path of the flue gas, departure from the balanced condition actuating relay mechanism which alters the flow of air or flue gas until balance is again restored. In general such an electrical control current requires to be of a relatively large value, and cannot conveniently be controlled directly by mechanism responsive to steam flow and/or pressure. It is therefore preferred to regulate primarily the current in a measuring circuit according to the steam flow and/or pressure, and to regulate the control current to a value proportional to the measuring current. It is further advantageous to effect this regulation of the control current by means which introduce a certain time lag, in order to avoid too rapid fluctuations in the air supply to the furnace with a rapidly fluctuating load.

It is preferred to regulate the current in the measuring and control circuits primarily in accordance with the steam flow, but to provide for further suitable variation of the current on any departure of the steam pressure from its correct value, in order to cause changes in the rate of combustion which will again restore the pressure to its correct value. By this means the air supply to the furnace may be regulated primarily to a pre-determined ratio to the steam flow, this ratio being modified on variation of the steam pressure.

It is advantageous to provide an indicator at the boiler front calibrated in terms of the rate at which fuel should be supplied to the boiler furnace. This indicator may be an electrical instrument connected in the control circuit, and will show a reading proportional or approximately proportional to the flow of flue gas, and means may be provided whereby the proportionality may be modified to suit the properties of the fuel used.

In the preferred form, as applied to a plurality of boilers, the present invention also provides means whereby the total load on the boiler plant may be distributed uniformly, or in the desired proportion among the boilers which are in operation.

The invention is exemplified in the accompanying drawings, in which:—

Fig. 1 shows diagrammatically the preferred combination of parts and operation of the invention as applied to a single boiler.

Fig. 2 shows diagrammatically the preferred method of application of the invention to a plurality of boilers.

In Fig. 1 the numeral 1 indicates an electrical flow-metering device which regulates the resistance of an electrical measuring circuit in inverse proportion to the flow of steam in the pipe 2 which carries the steam output of the boiler. The measuring circuit includes the flow metering device 1, winding 3, and part of the windings of the auto-transformer 4. The auto-transformer 4 is supplied from the transformer 5, or other source of voltage, and has a series of tappings 6 from which connection is taken to the measuring circuit by the contact arm 7. The contact arm 7 is operable by the pressure responsive element 8 which is connected to the pipe 2 so as to be responsive to the steam pressure therein, and which operates to change the tapping on which connection is made so as to raise the voltage in the circuit on a fall of pressure to below normal, and to lower the voltage on a rise of pressure. The winding 3 sets inductively on the rotatably mounted metallic disc 9 or equivalent conducting element so as to produce a torque proportional to the current. This may be effected by distributing the winding 3 as a bipolar winding on a suitable separately excited electromagnet, in the manner well known in split-phase induction integrating meters. The disc 9 is linked by suitable reduction gearing 10 to a variable resistance 11. In the circuit of the resistance 11, which constitutes the control circuit, is connected a winding 12 which sets inductively on the disc 9 in a manner similar to the winding 3, so as to produce a torque proportional to the current, but in the opposite direction to that produced by the winding 3. In general the winding 12 has a smaller number of turns than the winding 3, so that a larger current is necessary to exert the same torque on the disc. Connected also in the control circuit is a solenoid 13 which acts upon a core 14 suspended from a balance arm 15 which carries at its other end a bell 16. The bell is partially immersed in liquid in such a manner that it is subject to a force depending on the difference in pressure in the pipe connections 17 and 18 which lead to suitable positions in the boiler flues or elsewhere, so that the difference in pressure is proportional to the square of the velocity of the flue gas, or of the air supplied to the furnace. The balance arm 15 also is connected to a pilot valve 19 which controls the admission of fluid under pressure from the pipe 20 through pipes 21 or 22 to one or other end of the relay cylinder or servo motor 23 controlling the damper 24 in the boiler flue 25. An indicator 26 calibrated in terms of the rate at which fuel should be supplied to the furnace may also be connected in the control circuit.

In operation, on, say, an increase in the flow of steam in the pipe 2, the flow metering device 1 decreases the resistance in the measuring circuit, with the result that the current in the winding 3 is increased and the disc 9 commences to rotate, and, through the action of the gearing 10, the resistance 11 in the control circuit is decreased until the current reaches such a value that the action of the winding 12 opposing that of the winding 3 causes rotation of the disc 9 to cease. Thus the control current is regulated until it bears a definite ratio to the measuring current. With the increase in the control current the solenoid 13 acts with greater force on the core 14 and tilts the balance arm, so displacing the pilot valve and admitting fluid under pressure to one end of the servo-motor 23 which then acts to open the damper more fully. This results in an increase in the flow of flue gas, and the differential pressure across the bell 16 increases until the balance arm again moves to its normal or neutral position, closing the pilot valve and thus causing the movement of the damper to cease.

As the force acting on the core 14 varies as the square of the current, provided that the core is not worked at too high a flux density, and as the differential pressure across the bell 16 varies as the square of the flow of air to the furnace, it is evident that the damper is regulated until the flow of air is proportional to the current in the control circuit, and therefore to the flow of steam. Adjustment of the ratio of the flow of air to the flow of steam may be provided by having adjustable ratio of movement of the bell 16 and core 14, or by shunting the solenoid 13 with an adjustable resistance, or by providing adjustment in the ratio of influence of the current in the coils 3 and 12 on the disc 9.

On any variation of the steam pressure from its correct value the pressure responsive element 8 moves the contact arm 7 so as to alter the tapping on the auto-transformer 4 on which connection is made to the measuring circuit. The voltage applied to the measuring circuit is thus altered, and the consequent alteration in the current in the measuring and control circuits acts to change the ratio of flow of air to flow of steam so as to restore the steam pressure to its correct value.

The indicator 26 shows the rate at which fuel should be supplied to the furnace, and acts as a guide for controlling the mechanical stokers or other means for feeding in the fuel.

In the application of the invention to a plurality of boilers the control current is arranged to be proportional to the total combined steam output of the boilers and is passed through circuits in parallel, each circuit corresponding to one of the boilers. When the invention is applied to a plurality of boilers the lead wires L, L₁, of the control circuit of Fig. 2, are connected to the corresponding wires L, L₁ of the control circuit of Fig. 1. A switch 27, Fig. 2 and a variable resistance 28 is provided in each circuit, which includes also a solenoid 13 for operation of the damper control mechanism, as in the case of a single boiler. It is evident that if the resistances 28 are of equal value the control current is distributed equally in the various boilers, and regulates the boiler dampers so that the differential draught, and therefore the flow of air assuming the boilers to be similar, is equal for each boiler. Provided that this differential draught is measured between points not including the fuel bed, it is evident that the control is unaffected by any variations in the thickness of the fuel bed which may offer varying resistance to the passage of air. If it is desired to vary the distribution of load on the boilers, the resistances 28 may be set to different values so as to alter the distribution of current in the various circuits. If a boiler is out of operation the switch 27 corresponding to that boiler is opened and the control current is distributed in the correct increased proportion in the remaining circuits. The indicators 26, as before, show the rate at which fuel should be supplied to the furnace.

It will be understood that it is immaterial to the operation of the invention whether the control is effected by the regulation of a damper for each boiler or by the regulation of the speed of a forced draught fan motor, or the like, for each boiler. In some cases, however, it may be desirable to regulate a damper for each boiler, and in addition to regulate the speed of a forced or induced draught fan for the entire plant, to avoid an unnecessarily large consumption of power by the fan when the load on the boiler plant is light, and to avoid possible fluctuating operation of the air flow regulation due to the dampers being in a nearly closed position.

In such a case a further control circuit, preferably of relatively high resistance, may be provided in parallel with the other control circuits, and arranged to control a rheostat or other device regulating the fan speed by relay means such as are used in the other control circuits for regulating the boiler dampers. Such an additional control circuit and relay means may also be used to effect automatic variation of the stoker speed or speed of other auxiliaries or the like.

While the preferred combination of parts and method of operation has been described, it is obvious that numerous alterations in the details of such operation may be made without departing from the spirit or scope of the invention. Thus it is not essential to the operation of the invention that a measuring circuit separate from and additional to the control circuit should be provided, and the control circuit may be directly regulated by control current may be directly regulated by means responsive to steam flow and/or pressure. Again, it is not essential to use the solenoid pilot valve, and servo-motor mechanism described, and other equivalent relay mechanisms of mechanical or electrical types, operating on departure from a given relation between forces produced by the control current and forces depending on the difference in pressure at two points in the path of the air supply or flue gas may be used. Further, instead of solenoids, other electro-magnetic devices may be used to produce a force proportional to the square of the electrical current.

Having now particularly described and ascertained the nature of my invention, and in what manner the same is to be performed, what I desire to secure by Letters Patent of the United States is:—

1. A combustion regulating system for a furnace comprising a measuring circuit including a resistance variable as a function of steam flow from the furnace, a control circuit, an electro-dynamic device in said circuits and inductively acted upon by the current in said circuits for regulating the control current in accordance with variations in steam flow, an electro-magnetic device in said control circuit and furnace control means actuated by said last named device to restore said steam flow to its correct value.

2. In a control device of the class described the combination with a measuring circuit and a control circuit, of electro-dynamic means inductively acted upon by the current in said circuits for regulating the current in the control circuit to a value proportional to the measuring circuit.

3. In a control system for furnaces the combination with a measuring circuit and a control circuit, of an electro-dynamic mechanism inductively acted upon in opposite senses by the current in said circuits for regulating the control current to a value proportional to the measuring circuit current, said mechanism including a rotatably mounted conducting element.

4. A control system for a furnace comprising in combination measuring and control circuits, means for varying the current in the measuring circuit proportional to the flow of steam from the furnace, an induction motor having its coils respectively in the measuring and control circuits, variable resistance means in the control circuit and operable by the motor upon unbalancing of the current in the two circuits to restore balance between the two currents, means responsive to the flow of gases through the furnace, magnetic means controlled by the current in the control circuit, and means controlled jointly by said two last mentioned means for regulating the flow of gases through the furnace.

5. A control system for steam generating apparatus comprising a measuring and control circuit, resistance means in the measuring circuit variable as a function of steam flow, means in the control circuit for varying the resistance thereof, an inductive device controlled jointly by the current in said two circuits and operable upon unbalancing of said currents to operate the means in the control circuit to restore said balanced relation, pressure means responsive to the draft in the generating apparatus, an electro-magnet in series in the control circuit, lever means connecting said pressure means and magnet and adapted to have a balanced relation when the steam flow bears a definite relation to the draft, a control regulator for the draft and means connecting said lever and regulator and operable upon unbalancing of the lever to regulate the draft to restore the definite relation between the draft and steam flow.

6. The combination with a steam generating apparatus having a variable draft means by which the stem output is controlled, of control means for said draft means, means responsive to the volume of draft through the apparatus, magnetic means, said two last mentioned means jointly controlling the draft control means, two electrical control circuits, a variable resistance in each circuit and said magnetic means in one of said circuits, induction means controlled jointly by said two circuits and adapted to operate the variable resistance in the circuit with the magnetic means to maintain a balanced relation between said two circuits, and means for varying the other variable resistance in response changes in the steam flow.

7. In a control system of the class described the combination with a measuring and a control circuit, of a rotor, windings in said circuits exerting driving and retarding torques on said rotor to rotate the same upon departure of said torques from balanced relation, and means actuated by said rotor for regulating the control current to a value proportional to the measuring current.

8. In a control system of the type described, the combination with measuring and control circuits, of a rotor, windings in said circuits acting inductively on said rotor to rotate the same in one direction or the other depending upon which winding exerts the greater torque, said windings having unequal number of turns whereby a greater current flow in the winding of less turns is required to balance the effect of the other winding on the rotor, the torques of said windings arranged to have a balanced effect on said rotor when the currents in said circuits bear a definite relation to each other, and means actuated by said rotor upon rotation thereof to vary one of said currents to restore said balanced relation.

9. In a control system of the type described, the combination with measuring and control circuits, of a rotor, windings in said circuits acting inductively on said rotor to rotate the same in one direction or the other depending upon which winding exerts the greater torque, the control circuit winding having a lesser number of turns whereby a greated current is required in this circuit to exert the same torque as the measuring circuit winding, and means in said control circuit actuated by said rotor upon rotation thereof to regulate the current therein to a value proportional to the measuring current.

10. In a control system for maintaining a desired ratio between two rates of flow comprising a measuring circuit including means for effecting a current flow therein proportional to the rate of one of said flows, a control circuit including means for effecting a current flow therein bearing a definite relation to the current in the measuring circuit, a rotor for effecting operation of said last named means, windings in said two circuits exerting opposed driving torques on said rotor, said torques being balanced when the currents bear a definite relation to each other, an electro-magnet in said control circuit and producing a force, pressure means responsive to the other rate of flow and producing another force, said two forces arranged to have a balanced relation upon attainment of the desired ratio between the rates of flow, and means actuated by cooperation of said magnet and responsive means as a function of a departure from said balanced relation due to variation in one of said rates of flow for varying the rate of one of said flows to restore said balanced relation.

11. Means for maintaining a desired ratio between two fluid rates of flow, comprising in combination, means for maintaining an electric current proportional to one of said rates of flow, means for maintaining a second electric current proportional to said first electric current, said last means controlled jointly by the said two currents and operable upon departure from balanced relation between said two currents, means responsive to said second electric current, means responsive to the other rate of flow and means actuated by the differential of said two responsive means when one overbalances the other for adjusting one of said rates of flow to restore balance between said two responsive means.

12. A control system for maintaining a desired ratio between two fluid rates of flow, comprising in combination, measuring and control circuits, means in said measuring circuit for maintaining the current therein proportional in strength to one of said rates of flow, adjustable means in said control circuit for varying the current therein, means controlled solely by the current in said measuring and control circuits for operating the adjustable means to restore balance between said currents, an electro-magnet in said control circuit, means responsive to the rate of flow of the other flow, means controlled jointly by said magnet and last named means for adjusting one of said rates of flow to maintain a predetermined ratio between said flows as the other of said rates of flow varies.

13. A regulating system for maintaining a desired ratio between two rates of flow comprising a measuring circuit including means for maintaining the current therein proportional in strength to one rate of flow, a control circuit including adjustable means for varying the current flow therein, the current strength of said two circuits being related in a definite manner, means in said circuits and actuable upon unbalancing of the current in said circuits for actuating said adjustable means to restore balance, an electro-magnet in said control circuit, means responsive to the other rate of flow, and regulating means controlled jointly by the magnet and responsive means for regulating one of said rates of flow to maintain the desired ratio between said rates of flow.

In testimony whereof I affix my signature.

ALEXANDER G. S. SANDISON.